United States Patent [19]

Heise

[11] Patent Number: 5,152,330

[45] Date of Patent: Oct. 6, 1992

[54] TIRE BEAD BREAKING TOOL

[76] Inventor: James T. Heise, 13340 South 1300 West, Riverton, Utah 84065

[21] Appl. No.: 527,316

[22] Filed: May 23, 1990

[51] Int. Cl.⁵ ............................................. B60C 25/01
[52] U.S. Cl. ................................... 157/1.17; 157/1.3; 269/131; 269/132
[58] Field of Search ...................... 157/1.1, 1.17, 1.26, 157/1.28, 1.3, 1.21; 269/130, 131, 132; 254/21, 25, 131; 7/166

[56] References Cited

U.S. PATENT DOCUMENTS

| | | | |
|---|---|---|---|
| 568,753 | 10/1896 | Foth | 81/15.2 |
| 977,212 | 11/1910 | Morgan | 157/1.1 |
| 1,007,640 | 10/1911 | Butler | 157/1.17 |
| 1,043,208 | 11/1912 | Dahl | 157/1.26 |
| 1,439,381 | 12/1922 | Safstrom | 157/1.28 |
| 1,498,816 | 6/1924 | Smith | 157/1.26 |
| 1,609,732 | 12/1926 | McLaughlin et al. | 157/1.3 X |
| 1,839,781 | 1/1932 | Zimmersbach | 269/132 |
| 1,913,927 | 6/1933 | Johnson | 157/1.1 |
| 2,171,120 | 8/1939 | Bullard | 269/132 X |
| 2,226,757 | 12/1940 | Ewell | 157/1.3 |
| 2,300,840 | 11/1942 | Huxel | 254/21 X |
| 2,684,710 | 7/1954 | Calvin | 157/1.17 |
| 2,872,970 | 2/1959 | Bedingfield | 157/1.17 |
| 3,253,640 | 3/1966 | Paulauskas | 157/1.17 |
| 3,300,184 | 10/1965 | Ragolio | 157/1.17 |
| 4,646,806 | 3/1987 | Richardson | 157/1.17 |
| 4,655,271 | 4/1987 | Gamez | 157/1.26 |

FOREIGN PATENT DOCUMENTS

| | | | |
|---|---|---|---|
| 492045 | 11/1977 | Australia | 157/1.17 |
| 872983 | 6/1942 | France | 157/1.3 |
| 44981 | 9/1917 | Sweden | 157/1.3 |
| 915551 | 1/1963 | United Kingdom | 157/1.21 |

Primary Examiner—D. S. Meislin
Attorney, Agent, or Firm—Michael D. McCully; J. David Nelson

[57] ABSTRACT

A fully portable device for breaking the bead of a rubber tire from a wheel rim comprises an adjustable closeable loop strap mechanism, adapted to loop around a section of the wheel and tire, in a plane generally radial from the center of the wheel. The device includes a power screw link that is positioned directly over a portion of the tire sidewall, such that a foot on a power screw threaded into and through the link can engage the tire sidewall adjacent the rim. With the loop strap mechanism tightened down around the wheel and tire, turning the power screw urges the tire sidewall inwardly to pull the bead away from the wheel rim.

An urging tool is also provided for insertion into the gap between the rim and the bead to pry or otherwise leverage the bead up and over the annular safety flange of "safety rim" type cycle wheels.

In a compression-type clamp embodiment, the device of the present invention comprises one or more power screw links, each having a manually actuated power screw, removably attached to each other by loop strap mechanisms, in a manner to effect compression upon various objects to be clamped together.

7 Claims, 4 Drawing Sheets

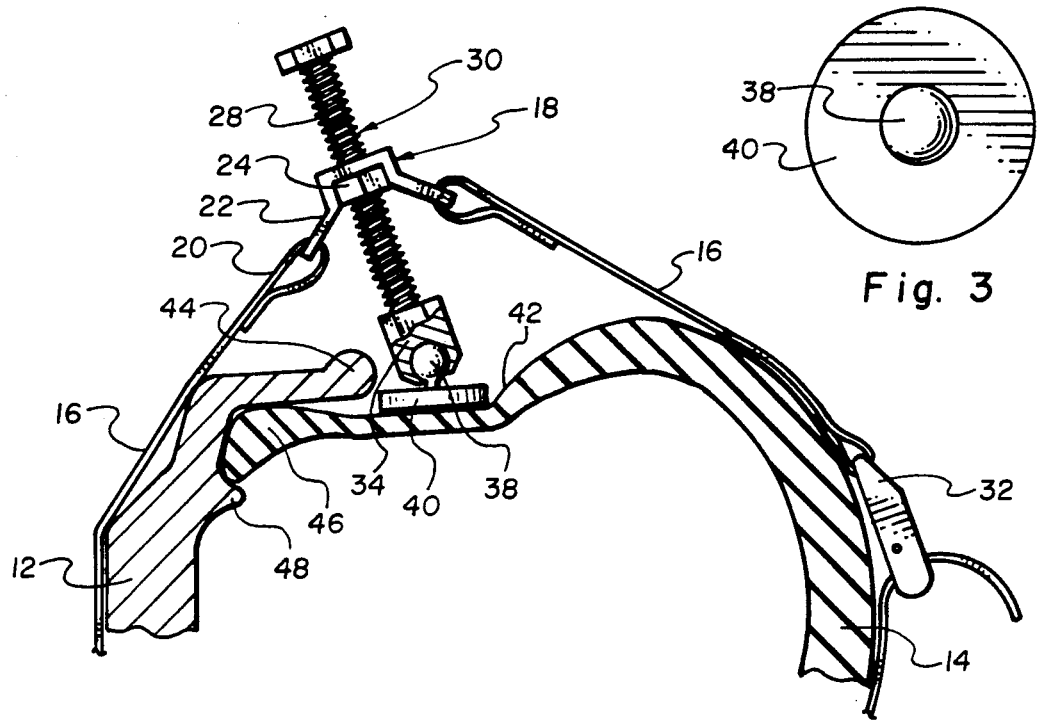
Fig. 3
Fig. 4
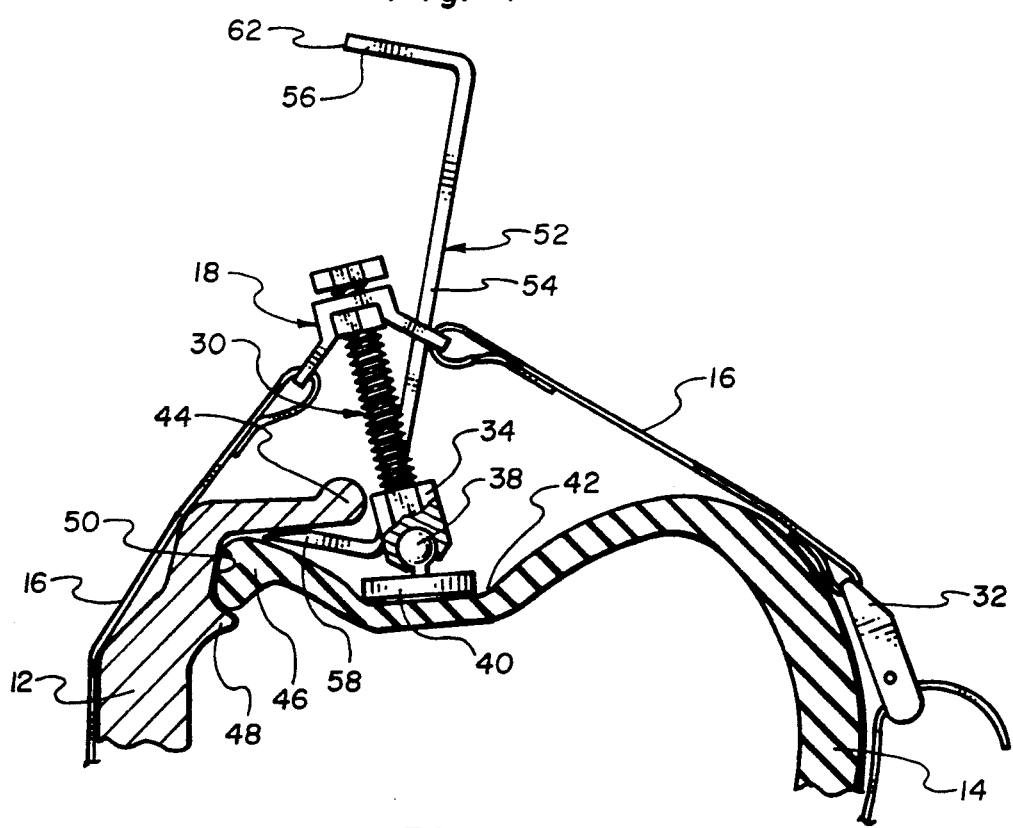
Fig. 5

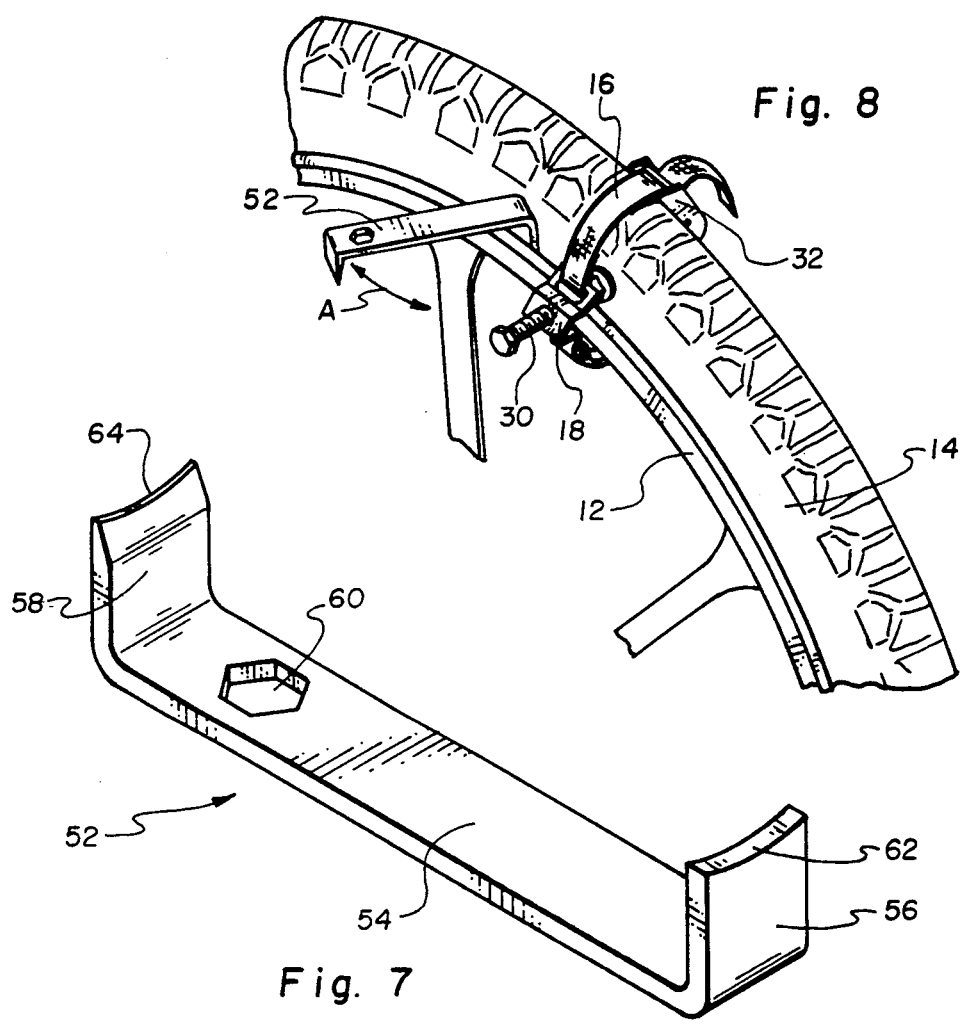
Fig. 8
Fig. 7
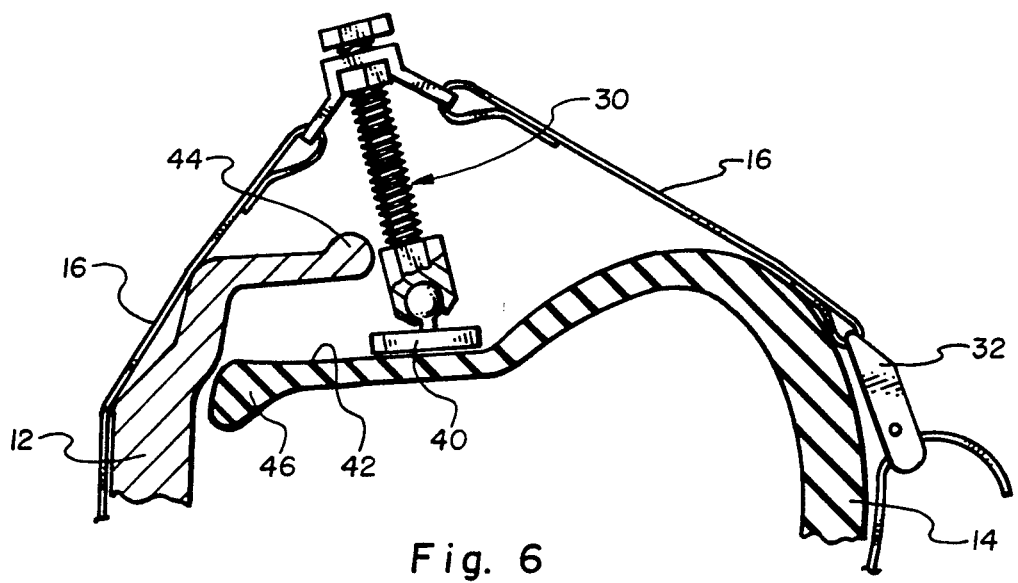
Fig. 6

TIRE BEAD BREAKING TOOL

BACKGROUND OF THE INVENTION

1. Field of the Invention

In removing a rubber tire from a metal mounting wheel for repair or replacement, the first step is to separate the tire bead (that part of the tire that engages the metal wheel rim) from the wheel rim, all the way around the tire and rim, such that both tire beads (both sides of the tire) can be placed in the center of the metal wheel, which has a smaller diameter than that of the metal rims, in order that the tire can then be removed from the wheel in a conventional manner. This initial step is called "breaking the bead" of the tire from the rim. The present invention pertains to a portable device for breaking the beads on rubber tires of all kinds, and has particular application to motorcycle and bicycle wheels and tires, and to other similar wheels that have annular raised flanges on the wheel surface inside the wheel rim that function to define a "nest" for the rubber tire bead. The device can also be used on wheels that do not have the raised flanges.

2. Description of the Prior Art

Prior to the introduction of hydraulically, pneumatically, or mechanically actuated tire repair machines, hammers and prying tools were used to break the tire bead from the mounting wheel rim. With the introduction of tire repair machines, this step is easily accomplished. However, inasmuch as such tire machines are definitely not portable, a stranded motorist, and specifically a stranded bicyclist or motorcyclist, must resort to the hammer and prying tool method for breaking the tire bead from the wheel rim in order to repair or replace the inner tube and/or tire.

A "portable" tire bead breaker has recently been introduced and is described in U.S. Pat. No. 4,655,271. However, such device, even though claimed to be portable, appears to be an order of magnitude larger and considerably more bulky than the outside diameter of the tire on which it is intended to break the bead from the wheel. As such, it can hardly be considered portable, especially as concerns a bicyclist or motorcyclist who must restrict carry-on baggage to items having considerably less bulk.

SUMMARY OF THE INVENTION

The present invention takes the form of an adjustable strap mechanism adapted to be wrapped around a tire and wheel (e.g., a motorcycle tire and wheel) in an axial plane, generally radial from the wheel center. The strap mechanism includes a metal link having a threaded power screw therein. The power screw includes a foot that is adapted to engage the sidewall of the tire adjacent the wheel rim, and a standard hexagonal head adapted to engage a convention socket and ratchet for driving the power screw.

With the power screw fully retracted, the link is positioned directly over a portion of the tire sidewall adjacent the wheel rim and the tire bead to be broken. With the strap tightened down around the wheel and tire, turning the power screw toward the tire will deform the tire sidewall generally toward the geometric center of the interior of the tire and away from the wheel rim.

In what is called a "standard rim", one with a more-or-less flat interior surface, such deformation of the tire sidewall will generally "pop" the tire bead loose and away from the wheel rim. However, when removing tires from "safety rims" that include inner annular flanges adjacent the rims for preventing the tire beads from slipping or otherwise breaking loose from the rim under severe lateral stress, the present invention further includes a shallow "U" shaped urging tool for inserting or otherwise working down into the space between the wheel rim and tire bead created by the deformation of the tire sidewall. The urging tool is then used to urge or otherwise "pop" the tire bead over the safety rim inner annular flange and loose from the wheel rim. Once the bead is broken between the tire and the rim, of course, the tire/tube can be easily removed, repaired, and/or replaced using conventional tire working tools.

BRIEF DESCRIPTION OF THE DRAWINGS

FIG. 3 is a top view of the foot of the power screw, taken generally along lines 3—3 of FIG. 1.

FIG. 4 is a partial radial cross-sectional view similar to FIG. 1, showing the power screw in an intermediate position when deformation of the tire sidewall has begun.

FIG. 5 is a view essentially identical to FIG. 4, showing the power screw in full extension and the tire sidewall deformed sufficiently to permit the urging tool to be inserted between the rim and tire bead to "pop" the tire bead loose from the rim.

FIG. 6 is a view essentially identical to FIG. 5, showing the tire bead being broken from a "standard wheel" rim—a wheel without the annular safety flange.

FIG. 7 is a perspective view of the urging tool.

FIG. 8 is a perspective partial view of a motorcycle tire and wheel, the tire bead breaking tool is position (essentially as shown in FIG. 5), and the urging tool in position adjacent the bead breaking tool to "pop" the tire bead loose from the wheel rim.

DETAILED DESCRIPTION OF THE INVENTION

Figure 1:
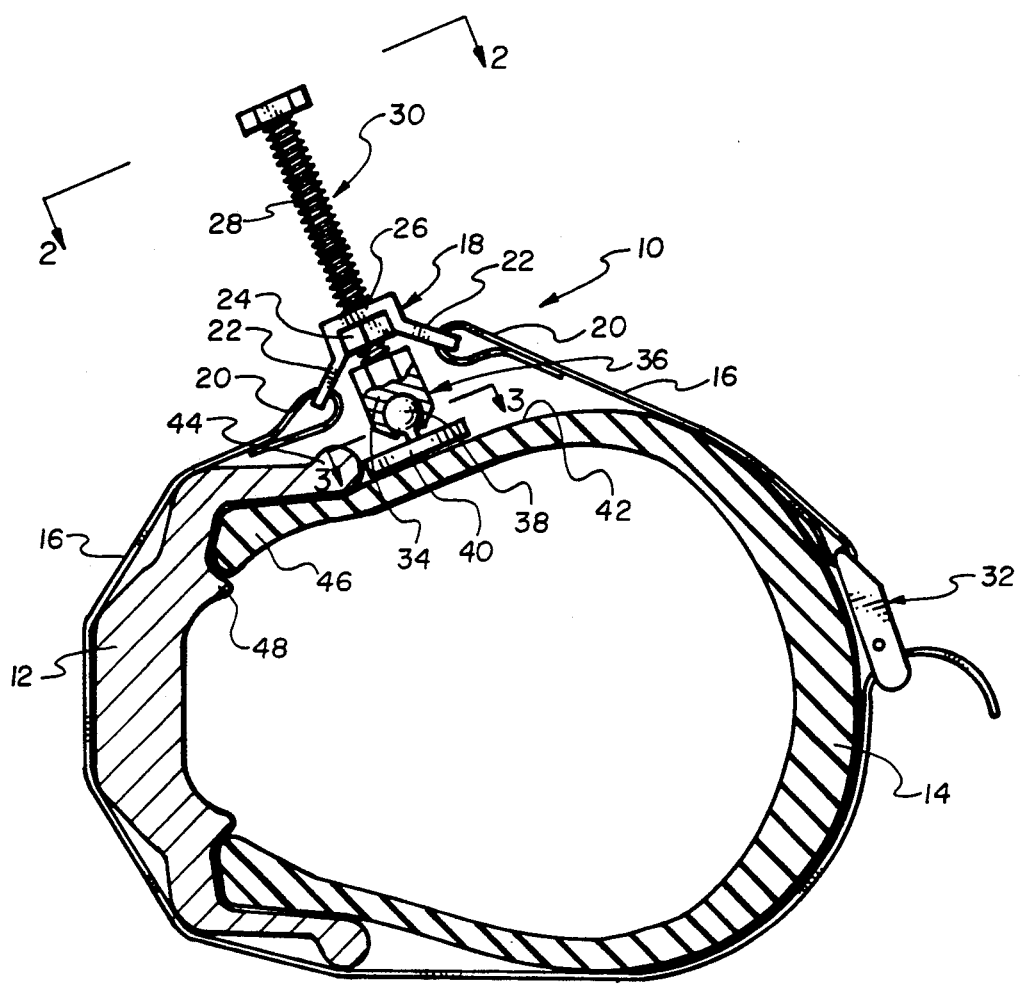
FIG. 1 is cross-sectional view of a tire and safety wheel, taken in the radial orientation, showing the portable tire bead breaking tool of the present invention in position on the tire and wheel in its initial position, prior to any deformation of the tire sidewall.
Figure 2:
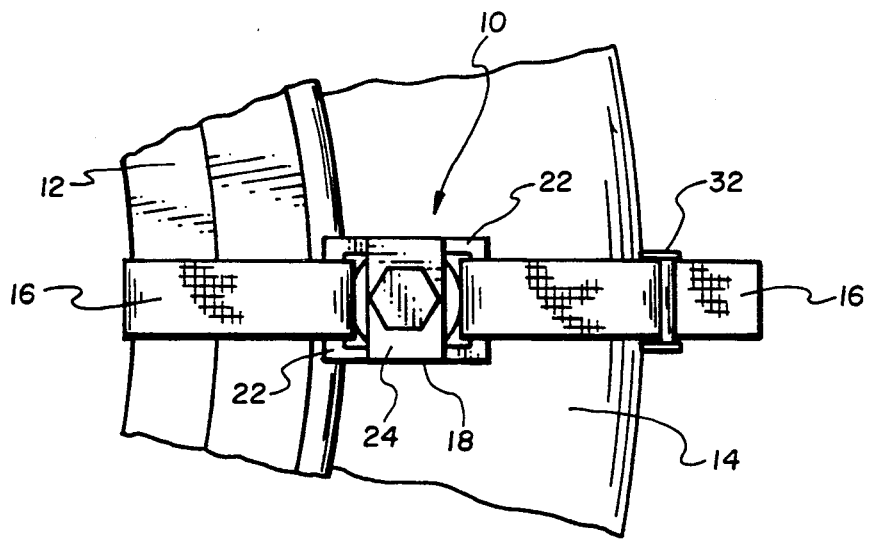
FIG. 2 is a partial view of the tire and wheel, taken along lines 2—2 in FIG. 1, showing the position of the tire bead breaking tool on the wheel and tire.

Turning now to the drawings and briefly first to FIG. 8, the portable tire bead breaking tool of the present invention is shown at 10 in functional position around a motorcycle wheel 12 and tire 14, in an axial plane generally radial relative to the center of the wheel. As indicated in FIG. 8, and more clearly shown in FIG. 1, the tire bead breaking tool 10 wraps entirely around the tire and wheel in a manner to be tightened down upon the tire and wheel. The tire bead breaking tool 10 comprises an adjustable, flexible strap mechanism 16 having a mechanical power screw link 18 attached thereto at respective end loops 20 of the strap mechanism 16. As may be shown more clearly in FIG. 2, these strap mechanism end loops 20 are attached through slotted tabs or ears 22 formed in the power screw link 18. As best shown in FIGS. 1, 4, and 5, the power screw link 18 comprises generally a main body section 24 having a threaded hole 26 therethrough, through which passes a threaded shaft portion 28 of a power screw 30.

The strap mechanism 16 includes a friction catch and adjustment mechanism 32 for removably and adjustably retaining a free end of the flexible strap by friction in a conventional manner. As those skilled in the art will appreciate, this adjustment mechanism 32 enables the user to quickly wrap the strap mechanism around a tire and wheel, position the power screw link 18 where desired, and tighten the strap mechanism down around the tire and wheel to hold the power screw link securely in place throughout the process of breaking the tire bead from the wheel.

The power screw 30 includes an end section 34 affixed thereto, the end section defining a ball and socket type universal movement mechanism 36. As shown, the power screw end section 34 defines the socket portion of the mechanism, and the ball portion 38 of the mechanism is the attachment of the power screw end section 34 to a power screw foot 40. As best shown in FIG. 3, this power screw foot 40 is circular or otherwise disk shaped in this preferred embodiment of the power bead breaking tool 10.

As those skilled in the art will readily appreciate, this ball and socket type universal movement mechanism 36 permits the power screw 30 to rotate relative to the power screw foot 40, and also permits the power screw foot to pivot, within limits, relative to the power screw end section 34 as the tire sidewall deforms during the bead breaking procedure.

OPERATION

In operation of the tire bead breaking tool 10 of the present invention, the strap mechanism 16 is initially positioned around the wheel 12 and tire 14, as shown in FIG. 8, and is oriented generally as shown in FIG. 1, with the power screw 30 generally normal to the plane of the surface of the tire sidewall 42 at the point of contact with the sidewall. Before the strap mechanism 16 is tightened down around the tire and wheel, the power screw 30 is positioned such that the power screw foot 40 is as close to the wheel rim 44 as is possible. This is to enable the direct force of the power screw (along the central axis of the power screw) to act as close to the tire bead as possible, where the tire is the stiffest and will be best able to transmit this power screw force along the tire bead, in addition to across the general area of the tire sidewall under the power screw foot.

With the tire bead breaking tool so positioned as shown in FIG. 1, the free end of the strap mechanism 16 is pulled tight in order to tighten the strap mechanism down around the wheel and tire. With the tire bead breaking tool so positioned, the user then rotates the power screw to extend the power screw through the power screw link such that the power screw foot 40 deforms the tire sidewall 42 inwardly toward the center airspace section of the tire.

FIG. 4 illustrates the deforming process of the tire sidewall 42 as the power screw is tightened down against the sidewall. Deformation of the tire sidewall 42 begins to separate the tire bead 46 from the wheel rim 44. As the power screw is screwed through the power screw link 18, the tire sidewall 42 severely deforms to form a shallow "U" shaped deformation at the point of contact of the power screw foot and tire sidewall. This is best shown in FIG. 5, wherein the power screw is essentially fully extended through the power screw link for maximum deformation of the tire sidewall. Such deformation as shown in FIG. 5 has the effect of urging the tire bead 46 downwardly and to the right, as shown in FIG. 5, away from the wheel rim 44.

FIG. 6 shows the tire bead breaking tool 10 in functional position around a "standard mounting wheel" rim—one that does not have an annular safety flange, but rather has a more-or-less flat inside surface. At maximum extension of the power screw (FIG. 6), the tire bead 46 can be easily "popped" loose from the wheel rim 44 of the standard mounting wheel, and the tire and tube removed or replaced in a conventional manner.

This is not the case, however, with motorcycle tires mounted on "safety wheels" or "safety rims". These "safety rims" include an annular raised flange 48 on the inside wheel surface, inboard of the wheel rim, which defines a channel 50 for "nesting" the tire bead against the mounting wheel rim. The purpose of this annular flange and channel 48, 50 is to retain the tire bead in functional position against the wheel rim 44 under severe lateral stress of the tire relative to the wheel, as occurs when a motorcycle is in a severe turning or cornering maneuver.

As previously mentioned, full extension of the power screw through the power screw link will generally enable a tire bead 46 to be "popped" loose from the wheel rim 44 of a standard wheel. However, in the case of safety wheels or safety rims, it is likely necessary to assist the tire bead in popping loose from the wheel rim by prying or otherwise urging the tire bead from the wheel rim. In this regard, the tire bead breaking tool 10 of the present invention also includes an urging tool 52 shown in FIG. 7. The urging tool 52 includes a generally elongate body section 54, an essentially flat, blunt end 56 extending generally normal to the body section, and a tapered or beveled end 58 extending generally normal to the body section. The urging tool 52 also includes a hexagonal hole 60 designed to engage the head of the power screw 30 for easy actuation of the power screw.

Referring again to FIGS. 5 and 8, it is shown that, once the tire sidewall 42 has been sufficiently deformed, the urging tool 52 can be inserted into the space between the tire bead and wheel rim in a manner to urge the tire bead from the channel 50, and up and over the safety annular flange 48 in order to "pop" the tire bead loose from the wheel rim. As best shown in FIG. 8, either end 56, 58 of the urging tool 52 is inserted downwardly into the space between the tire bead and wheel rim at a location as close to the power screw foot 40 of the tire bead breaking tool as is possible. In this regard, those skilled in the art will appreciate that it is preferable to insert the blunt end 56 of the urging tool between the tire bead and wheel rim, if possible, inasmuch as it is much less likely that the blunt end would cut or otherwise damage the tire bead, tire inner tube, or wheel rim. If this is not possible, however, the tapered or beveled end 58 is adapted to more easily fit down into a narrow space between the tire bead and the wheel rim for initially separating the bead from the rim. In this regard, it should be pointed out that the beveled side of the urging tool end 58 should engage the wheel rim, and the flat side of the beveled end 58 should face the tire sidewall and bead.

Regardless of the end 56, 58 of the urging tool that is inserted or wedged down between the tire bead and wheel rim, "rocking" the urging tool back and forth as indicated by arrow A in FIG. 8 causes the tire bead to be worked loose from the wheel rim. Again, it is preferable that the blunt end 56 be used to urge the tire bead from the wheel rim in this fashion; however, the beveled end can be used to get it started, and the blunt end then inserted when there is sufficient space between the wheel rim and tire bead. In this regard, FIG. 7 illustrates that each end 56, 58 of the urging tool includes an inside radiused surface 62, 64 respectively, that approximates the outside curvature of a typical fifteen inch motorcycle wheel at the location of the wheel rim. In this manner, therefore, the radiused surfaces 62, 64 of the urging tool can essentially fully engage corresponding surfaces of the mounting wheel adjacent wheel rim for urging the tire bead from the wheel rim, with a very low possibility of pinching, cutting, or otherwise damaging the tire bead or sidewall during the rocking action of the tool to urge the tire bead from the wheel rim.

It is recommended that the user position the tire and wheel generally vertically upright and, with one end of the urging tool in position adjacent the bead breaking tool, bear down with the heel of one hand as close as possible to the end of the urging tool that is wedged between the tire bead and wheel rim, while simultaneously rocking the free end of the urging tool back and forth, as shown in FIG. 8, in order to "pop" the tire bead loose from the wheel rim. Of course, if the bead doesn't readily pop loose once it has been urged away from the rim as far as the urging tool will permit, the user slides the urging tool around the "V" groove created between the rim and tire bead as the urging tool pries the bead loose, and continues the rocking action until the bead does fully break loose. Once the tire bead is popped loose from the wheel rim, the tire can be removed, repaired, or replaced in a customary fashion.

Figure 9:
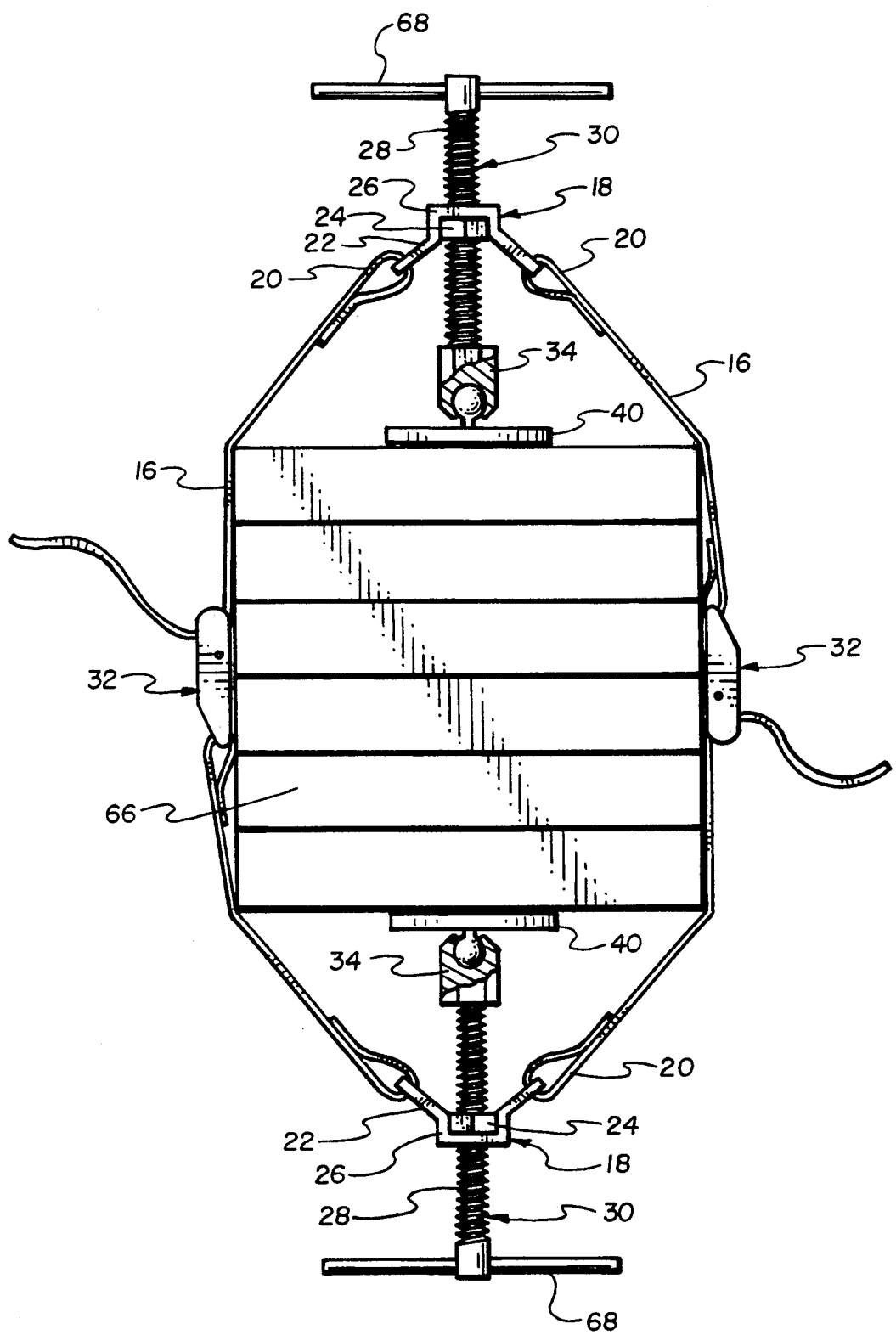
FIG. 9 is a side view of two tools of the present invention strapped around a number of wooden planks to be glued together under compression.

FIG. 9 is a side view of an embodiment of the tool of the present invention for use as a compression-type clamp. As shown, two such tools are connected together around a stack of wooden planks 66 which are to be glued together under compression. The two tools 10 are connected together by inserting the free end of the flexible strap mechanism 16 of the first tool into the strap length adjustment mechanism 32 of the second tool, and then inserting the free end of the strap mechanism of the second tool into the length adjustment mechanism of the first tool.

To use to tool of FIG. 9, the user tightens down both strap length adjustment mechanisms in a manner to maintain the power screws 30 in essential alignment as close to the center of the stack of planks as possible. He then actuates both power screws through their respective power screw links to urge the power screw feet 40 against both outside surfaces of the plank stack. In this regard, the power screws may have "T" handles 68 as their driving means, replacing the conventional hexagonal heads on the power screws when the tool is used as a tire bead breaking tool. This will enable the device to be used as a compression-type tool by hand, without the necessity for using other hand tools (i.e., a socket and ratchet).

Additionally, it is advantageous to utilize larger power screw feet 40 in the device of FIG. 9, inasmuch as it is intended that the pressure force exerted by the tool act across a much larger area than when used as a tire bead breaking tool, where the intent is to position the point (area) of force of the smaller power screw foot as close to the rim of the mounting wheel as possible, as has been previously explained.

Although the device as FIG. 9 has been referred to as a "compression-type" clamp, those skilled in the art will readily appreciate that, as in the tire bead breaking tool shown in the previous drawing figures, the tool of FIG. 9 applies a linear force to the object (the stack of planks) directly in line with the power screw axis. The "compression" facet of the tool lies in the manner in which the flexible strap mechanism is attached to the object, be it a tire and wheel, a stack of planks, etc. This should be contrasted with a true "compression" type strap tool, in which the compression is effected circumferentially around the object.

From the foregoing it will be seen that this invention is one well adapted to attain all of the ends and objectives herein set forth, together with other advantages which are obvious and which are inherent to the apparatus. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

What is claimed is:

1. Portable apparatus to break the bead of a rubber tire from the rim of a mounting wheel, comprising:
    (a) a strap mechanism for positioning around the tire and wheel in a generally radial orientation relative to the wheel center, said strap mechanism including a power screw link having a threaded hole therethrough, and strap means having one end thereof attached to said link and having the opposite end thereof attached to said link in a manner to form a closeable loop around the tire and wheel;
    (b) a power screw engaging said link threaded hole, said power screw having a power screw foot pivotally mounted to one end thereof for engaging the sidewall of the tire adjacent the head and directing the force of said power screw adjacent the bead, and driving means at the other end thereof for driving said power screw; and
    (c) an urging tool for assisting in separating the tire bead from the wheel rim, said urging tool comparing the shallow "U" shaped device having the two ends thereof adapted to be insertable between the tire bead and wheel rim, a first end of said urging tool including a tapered or beveled edge for permitting said first end to be easily inserted between the tire bead and wheel rim.

2. Apparatus as set forth in claim 1, wherein said urging tool has a generally flat main body portion.

3. Apparatus as set forth in claim 1, wherein said strap mechanism is adjustable in order to permit adjustment of the size of the closeable loop around the tire and wheel.

4. Apparatus as set forth in claim 1, wherein said power screw foot includes a universal mount to the end of said power screw in a manner to rotate and pivot within specified limits relative to the end of said power screw.

5. Apparatus as set forth in claim 4, wherein said universal mount comprises a ball and socket mechanism.

6. Apparatus as set forth in claim 1, wherein said urging tool further includes power screw attachment means for engaging said power screw driving means to enable said urging tool to be used to drive said power screw.

7. Apparatus as set forth in claim 1, wherein the ends of said urging tool are formed with inside radiused edges to permit the ends to fully engage the mounting wheel in the space between the tire bead and wheel rim.

* * * * *

UNITED STATES PATENT AND TRADEMARK OFFICE
CERTIFICATE OF CORRECTION

PATENT NO. : 5,152,330

DATED : October 6, 1992

INVENTOR(S) : James T. Heise

It is certified that error appears in the above-identified patent and that said Letters Patent is hereby corrected as shown below:

In column 6, line 34, "head" should be --bead--; and

Signed and Sealed this

Sixteenth Day of November, 1993

Attest:

BRUCE LEHMAN

Attesting Officer

Commissioner of Patents and Trademarks